United States Patent
Sarradin et al.

(10) Patent No.: US 11,164,185 B2
(45) Date of Patent: Nov. 2, 2021

(54) METHOD FOR CONTROL OF AUTHENTICITY OF A PAYMENT TERMINAL AND TERMINAL THUS SECURED

(71) Applicant: Ingenico Group, Paris (FR)

(72) Inventors: Jean-Louis Sarradin, Etables (FR); David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 1352 days.

(21) Appl. No.: 14/963,960

(22) Filed: Dec. 9, 2015

(65) Prior Publication Data

US 2016/0162892 A1    Jun. 9, 2016

(30) Foreign Application Priority Data

Dec. 9, 2014   (FR) ...................... 1462139

(51) Int. Cl.
| | |
|---|---|
| *G06Q 20/40* | (2012.01) |
| *G06F 21/44* | (2013.01) |
| *G07F 7/08* | (2006.01) |
| *G06Q 20/38* | (2012.01) |
| *G06Q 20/34* | (2012.01) |

(52) U.S. Cl.
CPC .......... *G06Q 20/401* (2013.01); *G06F 21/44* (2013.01); *G06Q 20/3567* (2013.01); *G06Q 20/3829* (2013.01); *G07F 7/0873* (2013.01); *G06F 2221/2153* (2013.01)

(58) Field of Classification Search
CPC .................................................. G06Q 20/382
See application file for complete search history.

(56) References Cited

U.S. PATENT DOCUMENTS

| | | | | |
|---|---|---|---|---|
| 6,012,049 A | * | 1/2000 | Kawan | G06Q 20/04 235/379 |
| 6,163,771 A | * | 12/2000 | Walker | G06Q 20/04 705/18 |
| 8,538,863 B1 | | 9/2013 | Saunders | |
| 2012/0234914 A1 | * | 9/2012 | Roux | G06Q 20/04 235/380 |

FOREIGN PATENT DOCUMENTS

| | | |
|---|---|---|
| EP | 2065836 A1 | 6/2009 |
| FR | 2824659 A1 | 11/2002 |

OTHER PUBLICATIONS

French Search Report and Written Opinion dated Aug. 5, 2015 for French Application No. 1462139, filed Dec. 9, 2014.
English translation of French Written Opinion dated Aug. 5, 2015 for corresponding French Application No. 1462139, filed Dec. 9, 2014.

* cited by examiner

*Primary Examiner* — John W Hayes
*Assistant Examiner* — Zehra Raza
(74) *Attorney, Agent, or Firm* — David D. Brush; Westman, Champlin & Koehler, P.A.

(57) ABSTRACT

A method and a payment terminal enable verification of the authenticity of a payment terminal. More particularly, a method is provided for processing a piece of initial data, carried out within the payment terminal, the payment terminal being configured to authorize a verification of its authenticity by using the piece of initial data. The method includes: obtaining at least one piece of information external to the payment terminal, called a piece of initial data; cryptographic processing of the piece of initial data, delivering a piece of processed data; visual and/or sound rendering of the piece of processed data.

5 Claims, 2 Drawing Sheets

Figure 1:
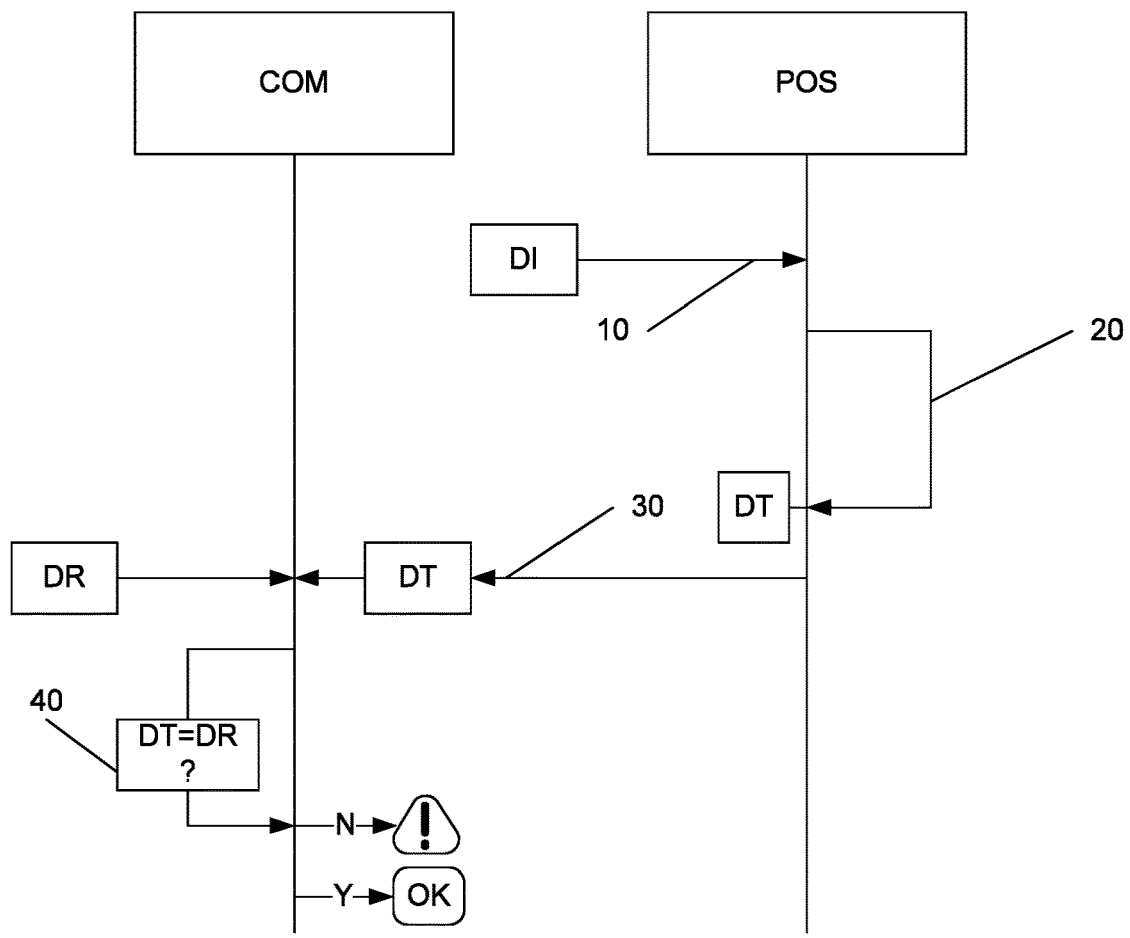

METHOD FOR CONTROL OF AUTHENTICITY OF A PAYMENT TERMINAL AND TERMINAL THUS SECURED

1. CROSS-REFERENCE TO RELATED APPLICATIONS

This Application is claims priority from and the benefit of French Patent Application No. FR 1462139, Filed Dec. 9, 2014, the content of which is incorporated herein by reference in its entirety.

2. FIELD OF THE DISCLOSURE

The proposed technique pertains to the field of payment terminals. The proposed technique pertains more particularly to the securing of payment terminals.

3. BACKGROUND OF THE DISCLOSURE

Electronic payment terminals undergo numerous attempts at hacking or theft. Indeed, owing to the nature of the information it contains and the sensitivity of the data that it processes, a payment terminal is an object much prized by malicious individuals A certain type of fraud especially is tending to become widespread: this is the technique of replacing a valid payment terminal by a counterfeit payment terminal. The valid payment terminal is stolen in a commercial establishment and immediately replaced by a payment terminal that appears to be valid but has actually been either modified, for example to read and copy out data from customers' bank cards, or completely emptied of its contents and replaced by a simple piece of hardware for reading and recording customer data. The unsuspecting merchant can thus easily be duped and it will be several days before he realizes that his terminal has been replaced or hacked into.

One way to resolve this problem of replacement is to apply a tag to the terminal. Such a tag enables a merchant to realize that his terminal has been replaced. This technique is efficient provided that the fraudulent individual is not himself capable of reproducing this tag. This technique is hence limited by the fraudulent individual's capacity to reproduce the tag. Now, for a tag to be efficient, it must be visible. But if this tag is visible, it is also visible to the fraudulent individual who can therefore easily reproduce it. Thus, this simple tagging solution is actually not efficient.

Another way to resolve this problem is to have only a wired payment terminal, i.e. a payment terminal that is physically connected to a cash register for example. This solution is of course efficient but actually unsuited to the current practice in which merchant and their customers are offered high mobility. However, this technique is used for example in big stores and in certain types of shops.

The existing techniques are nevertheless limited when it comes to avert or prevent the performance of fraud in smaller shops. There is therefore a need to provide a technique that enables the merchant to detect fraud by substitution of terminals and that enables him to take steps to prevent the negative effects of such fraud.

4. SUMMARY

An exemplary embodiment of the proposed technique pertains to a method for verifying authenticity of a payment terminal comprising a step for obtaining at least one piece of information external to said payment terminal and at least one step for processing said external piece of information, said processing step delivering a piece of encrypted information, and a step for comparing the encrypted information obtained with at least one corresponding piece of information inaccessible to the payment terminal.

Thus, the comparison between the encrypted information obtained from the payment terminal and the piece of reference data corresponding to this piece of encrypted information makes it possible to verify whether the payment terminal is an authentic terminal or whether it is a compromised terminal. This disclosure does not pertain to checking an identity of the payment terminal (for example an encrypted serial number or another piece of data of this type) but sends a challenge to the payment terminal and ascertains that the payment terminal is capable of producing a correct response to this challenge. If the terminal is not capable of taking up the challenge or if the result of this challenge is wrong, then, it is quite simply detected that the terminal is a fake, i.e. it means that the terminal is modified.

More specifically, at least one embodiment of the described technique pertains to a method for processing a piece of initial data, carried out within a payment terminal, the payment terminal being configured to authorize a verification of its authenticity by means of said piece of initial data. Such a method comprises:
- a step for obtaining at least one piece of information external to said payment terminal, called a piece of initial data;
- a step of cryptographic processing of said piece of initial data, delivering a piece of processed data;
- a step for rendering said piece of processed data.

Thus, in a simple way, the user is capable of obtaining knowledge of two major aspects of securing, namely, on the one hand the capacity of the terminal to respond to the challenge made to it: if the terminal is unable to obtain external information, then it is immediately deduced from this that the terminal is compromised. Besides, if the terminal is capable of understanding that a challenge has been sent to it, then a rendering of the result of the challenge is obtained.

According to one particular characteristic, subsequently to said step for rendering said piece of processed data, there is a step for verifying correlation between said piece of processed data and a piece of reference data.

Thus, the rendering of the challenge (sent out by the terminal) is compared with a piece of reference information in the merchant's possession (for example a specific card comprising the result of the challenge). If the result given by the terminal is different from this piece of reference data, then it can be concluded that the terminal is compromised.

According to one particular characteristic, said step for obtaining implements at least one data acquisition module belonging to the group comprising:
- a smartcard reader;
- a magnetic card reader;
- a barcode reader;
- a contactless reader.

Thus, the different interfaces for reading payment means are used to obtain the piece of initial data. As compared with other techniques (such as for example keypad entry), there are two advantages: firstly, the merchant does not himself know the challenge launched to the terminal; secondly, the acquisition modules, given the nature of the terminal, are extremely well secured: it is therefore very difficult for a hacker to try and obtain this piece of initial data before purloining the terminal at the merchant's place in order to modify and compromise it.

According to one particular characteristic, said step for processing said piece of initial data comprises a step for encrypting said piece of initial data.

Thus, unlike the prior-art techniques which are limited to decrypting an identity (such as a serial number) that is encrypted within the terminal, the present technique encrypts the transmitted information. This means that the terminal does not need to know a piece of additional information: it uses a piece of information that it already possesses (an encryption key) to at least partly convert the piece of initial data.

According to one particular characteristic, said step of encryption is a step for hashing said piece of initial data by means of a private key recorded within a secured memory of the payment terminal.

Thus, the obtaining of the processed data is simple and fast.

According to one particular characteristic, said piece of initial data is an answer to a reset transmitted by a smartcard subsequently to its insertion into the payment terminal.

Thus, the proposed technique is used to define a unique "smartcard/payment terminal" pair: for a hacker, it is thus extremely difficult to counterfeit the terminal.

According to one particular characteristic, said rendering step comprises a step for printing the piece of processed data by means of a printer of said payment terminal.

According to another aspect, the described technique also pertains to a payment terminal configured to verify its authenticity by means of a piece of initial data. Such a payment terminal comprises:
- a module configured to obtain at least one piece of information external to said payment terminal, called a piece of initial data;
- a module configured to process said piece of initial data and deliver a piece of processed data;
- a module configured to render said piece of processed data.

An exemplary embodiment of the present disclosure also pertains to a control device configured to carry out a control of authenticity of a payment terminal. Such a device comprises:
- a piece of information external to said payment terminal, called a piece of initial data, said piece of initial data being accessible by means of a communications interface between the control device and a payment terminal;
- a piece of reference data, recorded on a visible face of said control device, with which a user can verify a correlation between a piece of processed data, obtained by the payment terminal from said piece of initial data, and said reference data.

According to an exemplary implementation, the different steps of the methods according to the proposed technique are implemented by one or more software programs or computer programs comprising software instructions that are to be executed by a data processor of a relay module according to the proposed technique and are designed to command the execution of the different steps of the methods.

As a consequence, the proposed technique is also aimed at providing a program capable of being executed by a computer or a data processor, this program comprising instructions to command the execution of the steps of a method as mentioned here above.

This method can use any programming language whatsoever and can be in the form of a source code, object code or intermediate code between source code and object code, such as in a partially compiled form or in any other desirable form.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by a radio or by other means. The program according to the proposed technique can be especially uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc.

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

5. BRIEF DESCRIPTION OF THE DRAWINGS

Figure 3:
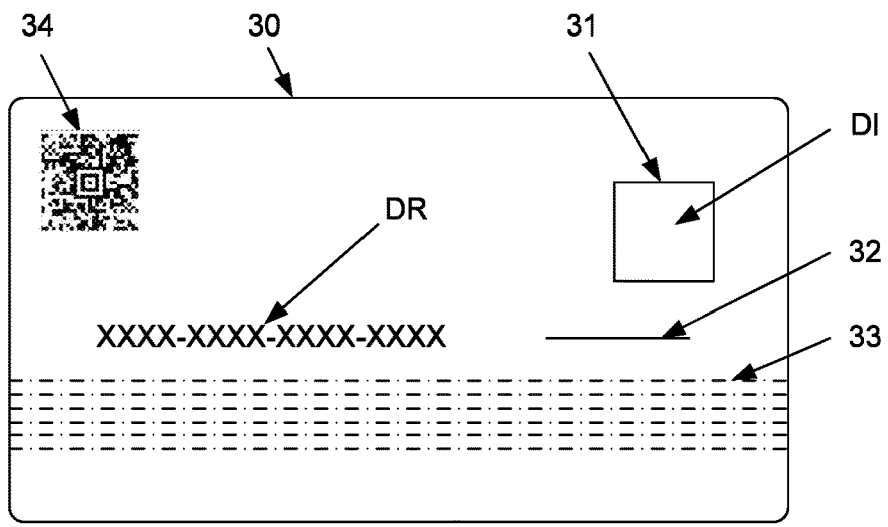
Figure 2:
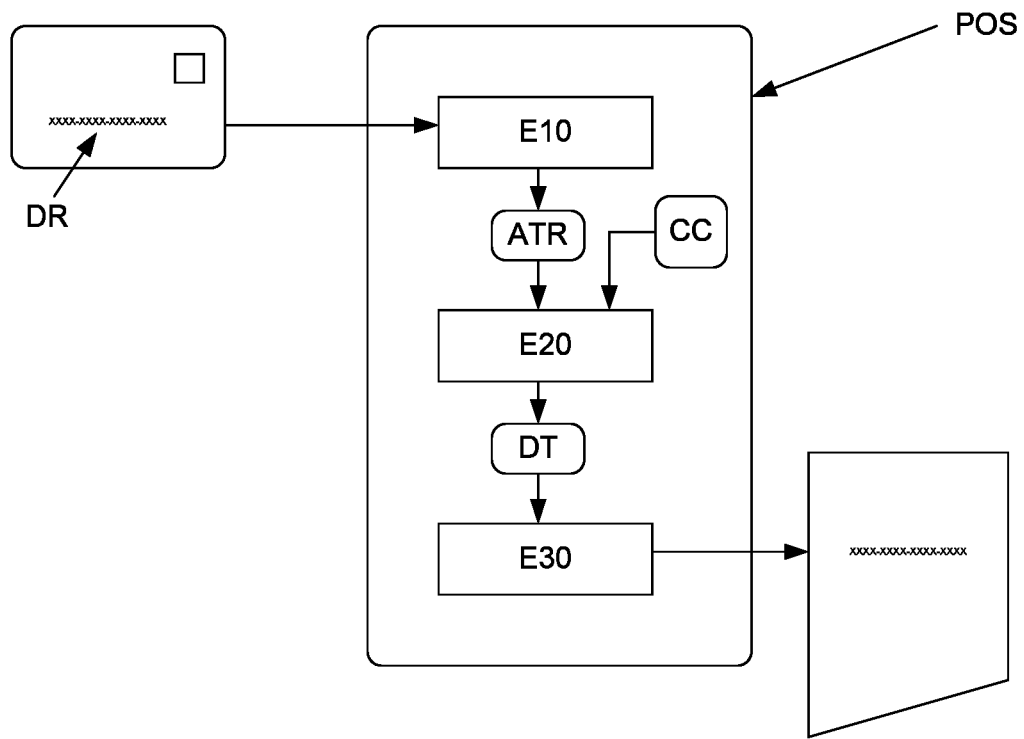
Figure 4:
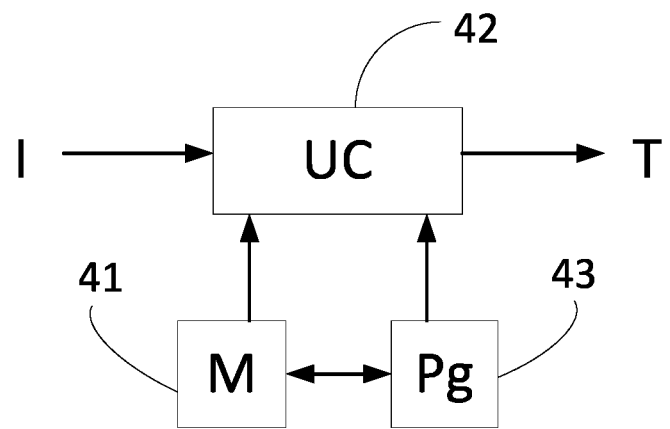

Other features and advantages of the proposed technique shall appear more clearly from the following description of an exemplary embodiment, given by way of a simple illustratory and non-exhaustive example and from the appended drawings, of which:

FIG. 1 is a block diagram of the proposed technique;

FIG. 2 explains the phase of treatment of the initial piece of information;

FIG. 3 describes a device for controlling and checking authenticity;

FIG. 4 describes a payment terminal integrating an authenticity verification element.

6. DETAILED DESCRIPTION OF ILLUSTRATIVE EMBODIMENTS

6.1. Reminder of the Principle

The merchant faced with the theft of one or more payment terminals and their modification often suffers major financial loss. This merchant therefore needs to be given a simple and efficient means for verifying the authenticity of the terminal in his possession. To this end, the presently disclosed technique proposes to compare the result of an internal operation carried out by the payment terminal with an expected result (reference data) previously known to the merchant. If the reference data is identical to the internal operation performed by the terminal, then the terminal is considered to be not compromised. The expected result (reference data) can take several forms, the simplest, from the viewpoint of the processing to be made, being a sequence of numerical or alphanumerical characters. Other forms of expected results such as images and sounds can also be used. The general principle of the proposed technique is described with reference to FIG. 1.

In general, the proposed method implemented by the payment terminal (POS) comprises:
- a step (10) for obtaining at least one piece of information external to said payment terminal, called a piece of initial data (DI);
- a step (20) for processing said piece of initial data (DI) delivering a piece of processed data (DT);
- a step of visual and/or sound rendering (30) of said processed data (DT).

Subsequently to the rendering by the payment terminal of the piece of processed data, the merchant (COM) compares (40) this piece of processed data (DT) with a corresponding piece of reference data (DR) in his possession. When the reference data differs from the processed data rendered by the payment terminal, the merchant can deduce therefrom that the payment terminal is compromised (i.e. that the payment terminal has undergone an unauthorized modification). When the reference data is equal to the processed data, the compromising of the payment terminal is not proven and the merchant can use the terminal with a reasonable degree of confidence.

In at least one embodiment, to be more efficient, subsequently to the rendering of the processed data by the terminal, the terminal awaits confirmation from the merchant that the processed data is identical to the reference data. This confirmation can be in the form of pressing a key of the payment terminal. The payment terminal can then work normally.

In at least one embodiment of the proposed technique, the payment terminal cannot carry out the transaction when the verification of the authenticity of the terminal has not been made. It is known that when it is being put into operation (for example daily), the payment terminal makes routine checks needed for its operation. In this embodiment, it is proposed to add the disclosed verification in the present technique. This verification then becomes obligatory. Without this verification, the terminal cannot work. It consists in making a request, when starting, for the supply of external information. If the merchant is capable of providing this external information, then the terminal performs the previously described verification technique.

If the merchant (or any other person) is not able to provide the initial data or if he does not confirm that the processed data is identical to the reference data (see previous embodiment), then the terminal does not start.

In at least one embodiment of the proposed technique, the payment terminal has a choice of at least two methods for obtaining external information. In this embodiment, the payment terminal decides on the way on which the external information must be obtained. In this embodiment, the first mode of obtaining external information is for example the insertion of a verification card (smartcard or magnetic card) specifically provided for this purpose. The second mode of obtaining external information is for example the entry, by means of the keypad of the payment terminal, of a series of numerical or alphanumerical pieces of data. On a complementary basis, this series of numerical or alphanumerical pieces of data is printed on the verification card. A third mode of obtaining can for example consist of a capture (by means of a barcode reader) of a 2D barcode containing external information. The payment terminal alternately and randomly decides to use either of its available methods for obtaining. Thus, the merchant can visually observe the discontinuity of the requests for obtaining from the payment terminal and immediately, even before entry, have a piece of information that can provide him with information about the efficient functioning of the terminal: it is indeed very unlikely that the terminal will require that external information be obtained identically at each verification. Thus, with this embodiment, the level of security is further augmented. However, such a mode of implementation of the described technique would have to be reserved for certain particularly difficult types of environments, liable to face numerous attacks by fraudulent persons.

6.2. Description of One Embodiment

As indicated here above, the proposed technique offers the possibility, for example to the merchant or to any other person in charge of managing payment terminals, of checking or verifying whether the payment terminal is an authentic terminal or whether it is a compromised terminal (i.e. for example one that has been purloined and modified).

In this (simple) embodiment of the proposed technique, the merchant has a card, preferably a smartcard, for verifying authenticity. The processing in this embodiment is presented with reference to FIG. 2.

The verification card is used at two points in time: when obtaining external information, the card (Crd) is inserted (E10) into the terminal (POS); more specifically, the external information is encoded in the card (namely in the chip of the card or on its magnetic tape); the second instant when the card (Crd) is used is during the verification (E40) by the merchant: the reference data (DR) is printed on the card (Crd). Thus, it is easy for the merchant to compare the reference data with the data rendered by the payment terminal.

In this embodiment, to make it easier for the merchant, the rendering (E30) of the processed data (DT) is done by making a print (E31) of this information (DT) on a receipt. This receipt, thereafter called a verification receipt, is printed by the printer of the payment terminal. As an alternative, if the terminal does not have any printer, the processed data is displayed on the screen of the payment terminal. The advantage of having a printed receipt lies in the absence of any need to keep hold of the terminal to make a verification and therefore the absence of any need to verify that a control has been carried out on the terminal.

In this embodiment, the external information (initial data) given to the terminal by the card is the ATR (Answer to Reset). ATR is the answer to reset. An answer to reset (ATR) is a message output by a smartcard contact according to the ISO 7816/CEI standard after electrical resetting of the chip of the card by the payment terminal. The ATR transmits information on the communications parameters proposed by the card and the nature and state of the card. One example of an ATR is "3B 02 14 50". This piece of external information is not available for the terminal. It depends on the card. Thus, the advantage of using the ATR, as compared with other information, is that a "card/terminal" pair is formed. Thus, a useful characteristic, in the context of the present technique, is to have available a relatively unique piece of initial data which, it can be certain, will be very difficult for a hacker to know and reproduce without stealing the card.

When the terminal is in possession of this piece of initial data, it applies a computer processing operation to it. This processing operation is aimed at converting the piece of initial data (DI) which is the ATR into a piece of data that can be compared (DR). The utility of this is to make this conversion specific to the payment terminal which carries it out: this means that a terminal that is compromised will not give the same result as an authentic terminal.

Several possibilities of conversion can be used. One worthwhile possibility is to apply (E20) a hash function to the ATR by means of a private key (CC) of the payment terminal. The advantage of this solution is that the private key of the payment terminal cannot be compromised even if this terminal were to be stolen and modified: indeed, there are protection mechanisms internal to the terminal which cause an erasure of the secured memory of the terminal when an attempt is detected to open or modify the terminal.

Thus, even if the terminal is replaced, modified or rendered to the merchant without him spotting the momentary disappearance of the terminal, the modification made will have necessarily led to an erasure of the secured memory of the terminal. Since it is this memory that contains the public and private keys of the terminal, it is certain that the compromised terminal which is returned to the merchant no longer has the same keys that it had when it was purloined. Thus, the result of the hash function performed on the ATR of the card will necessarily be different from the non-compromised result. The merchant can thus quickly spot the fact that his terminal has been compromised.

Complementarily, a binary rotation of the piece of initial data is made before the encryption operation. This binary rotation is made according to a predetermined binary rotation parameter which is proper to the terminal. The binary rotation parameter is injected into the secured memory of the terminal randomly at the time of its manufacture and/or its configuration when it exits the production line. Thus, the binary rotation parameter is potentially different from one terminal to another, thus making it more difficult to falsify the terminal because in addition to obtaining encryption keys, the hacker must also obtain the binary rotation parameter.

6.3. Other Characteristics and Advantages

According to another aspect, the technique described also pertains to a device for verifying the authenticity of the terminal, presented with reference to FIG. 3. More particularly, the disclosure also pertains to an external verification device (30) comprising firstly the piece of initial data (DI) and secondly the piece of reference of data (DR). According to one particular embodiment, such a verification device takes the form of a multi-mode memory card. Such a multi-mode memory card comprises for example a chip (31) and a contactless antenna (32). Complementarily, such a card comprises a magnetic tape (33). The piece of initial data (DI) not visible to the user, can be obtained by a payment terminal only by using one of the communications interfaces provided for this purpose (i.e. a smartcard reader, a magnetic card reader, a barcode reader, a contactless reader). When the piece of initial data is contained in the barcode (34) in two dimensions (for example printed on a smartcard), this piece of initial data is then encrypted in the 2D barcode by means of a second encryption key (for example a symmetrical encryption key) possessed by the payment terminal. Thus, before carrying out the cryptographic processing of the initial data, the payment terminal performs an operation for decrypting the initial data encoded in the 2D barcode. The initial data is then the data coming from this decryption of the 2D barcode.

In one particular embodiment, the external device takes the form of a smartcard, comprising firstly the reference data embossed on the card and secondly a chip, the sole function of which is to have available a specific piece of data called a piece of initial data obtained after a resetting of the card by the payment terminal. In this case, this piece of data included in the smartcard is an answer to a reset (ATR). In this embodiment, the proposed method presented comprises, on the part of the terminal, a step for resetting the smartcard inserted into the smartcard reader of the payment terminal.

Referring therefore to FIG. 4, a payment terminal is described comprising means for executing the method described here above.

For example, the payment terminal comprises a memory 41 constituted by a buffer memory, a processing unit 42, equipped for example with a microprocessor and driven by the computer program 43, implementing the operations needed to carry out payment functions.

At initialization, the code instructions of the computer program 43 are for example loaded into a memory and then executed by the processor of the processing unit 42. The processing unit 42 inputs for example a piece of data external to the terminal, called a piece of initial data. The microprocessor of the processing unit 42 implements the steps of the method for verifying authenticity according to the instructions of the computer program 43 to enable the merchant to verify the authenticity of the terminal.

To this end the payment terminal comprises, in addition to the buffer memory 41, means for obtaining a piece of information external to said payment terminal, called a piece of initial data, these means taking the form of a smartcard reader and/or a magnetic card reader and/or a barcode reader and/or a contactless reader (for a contactless card). The terminal also comprises processing means, especially means for cryptographic processing of the initial data to deliver a piece of processed data; these processing means comprise for example a security processor or an encryption processor; the terminal also comprises one or more sets of encryption keys in order to carry out the treatment of the initial data and provide a piece of processed data which can be compared with a piece of reference data. In order that the processed data can be compared, the terminal also comprises means for rendering this piece of processed data. These rendering means take for example the form of a paper printer, capable of printing the processed data on a receipt. These rendering means also take the form of a specific man-machine interface displayed on the screen of the terminal which displays the processed data.

These means can be driven by the processor of the processing unit 42 as a function of the computer program 43.

An exemplary embodiment of the proposed technique does not have the drawbacks of the prior art.

Although the present disclosure has been described with reference to one or more examples, workers skilled in the art will recognize that changes may be made in form and detail without departing from the scope of the disclosure and/or the appended claims.

The invention claimed is:

1. A method for verifying the authenticity of a payment terminal, the method comprising:
   inserting a smartcard into a smartcard reader of the payment terminal;
   receiving, at the payment terminal, from the smartcard inserted into the smartcard reader, an Answer to Reset message according to ISO 7816 standard;
   processing, by the payment terminal, the Answer to Reset message, wherein processing comprises:
   performing a binary rotation of the Answer to Reset message, according to a predetermined binary rotation parameter proper to the payment terminal;
   delivering a rotated Answer to Reset message;
   encrypting the rotated Answer to Reset message; and
   rendering the encrypted rotated Answer to Reset message as a piece of processed data; and
   verifying, subsequently to said rendering of said piece of processed data, a correlation between said piece of processed data and a piece of reference data.

2. The Method according to claim 1, wherein said encrypting comprises hashing the rotated Answer to Reset message using a private key recorded within a memory of the payment terminal.

3. The Method for processing according to claim 1, wherein said rendering comprises printing the piece of processed data using a printer of said payment terminal.

4. A payment terminal comprising:
   a smartcard reader;
   a processor; and
   a non-transitory computer-readable medium comprising instructions stored thereon, which when executed by the processor configure the payment terminal to:
   receive, from a smartcard inserted into the smartcard reader, an Answer to Reset message according to ISO 7816 standard as a piece of initial data;
   perform a binary rotation of the Answer to Reset message, according to a predetermined binary rotation parameter proper to the payment terminal;
   delivering a rotated Answer to Reset message;
   encrypt the rotated Answer to Reset message; and
   render said encrypted rotated Answer to Reset message as a piece of processed data, so as to enable verifying a correlation between said piece of processed data and a piece of reference data.

5. A non-transitory computer-readable medium comprising program code instructions stored thereon to perform a method when the program is executed by a processor of the payment terminal, wherein the method comprises:
   receiving from a smartcard inserted into the smartcard reader, an Answer to Reset message according to ISO 7816 standard;
   processing the Answer to Reset message, wherein processing comprises:
   performing a binary rotation of the Answer to Reset message, according to a predetermined binary rotation parameter proper to the payment terminal;
   delivering a rotated Answer to Reset message;
   encrypting the rotated Answer to Reset message; and
   rendering the encrypted rotated Answer to Reset message as a piece of processed data, so as to enable verifying a correlation between said piece of processed data and a piece of reference data.

* * * * *